(12) United States Patent
Lutkemeyer

(10) Patent No.: US 8,601,048 B2
(45) Date of Patent: Dec. 3, 2013

(54) IMPLEMENTATION OF DIGITAL SIGNAL PROCESSING FUNCTIONS USING MAXIMAL EFFICIENCY AND MINIMAL ENERGY DISSIPATION

(75) Inventor: Christian Lutkemeyer, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2534 days.

(21) Appl. No.: 11/029,990

(22) Filed: Jan. 5, 2005

(65) Prior Publication Data
US 2006/0149805 A1 Jul. 6, 2006

(51) Int. Cl.
*G06F 7/50* (2006.01)
*G06F 7/52* (2006.01)

(52) U.S. Cl.
USPC .......................... 708/708; 708/629

(58) Field of Classification Search
USPC .................. 708/629, 632, 708, 709
See application file for complete search history.

(56) References Cited

U.S. PATENT DOCUMENTS

| | | | | |
|---|---|---|---|---|
| 4,228,520 A | * | 10/1980 | Letteney et al. | 708/629 |
| 4,769,780 A | | 9/1988 | Chang | |
| 5,220,525 A | * | 6/1993 | Anderson et al. | 708/631 |
| 5,623,683 A | | 4/1997 | Pandya et al. | |
| 6,065,033 A | * | 5/2000 | Jouppi | 708/670 |
| 6,615,229 B1 | * | 9/2003 | Vijayrao et al. | 708/629 |
| 2003/0098870 A1 | | 5/2003 | Komoda | |

OTHER PUBLICATIONS

Ienne P et al, "Arithmetic Transformations to Maximize the Use of Compressor Trees", Online!, Federal Institute of Technology Lausanne, Processor Architecture Laboratory, Jan. 2004, pp. 1-6, XP002352526, http://lapwww.epfl.ch.publications.

Callaway T et al, "Optimizing Arithmetic Elements for Signal Processing", Dept. of Electrical and Computer Engineering, University of Texas at Austin, Online! Oct. 28, 1992, pp. 91-100, XP002352527, http://ieeexplore.ieee.org.

Cadence Data Sheet, "SMIC-Cadence Low Power Digital Reference Flow for Energy-Efficient 130 Nanometer SOC Designs", Online! 2004, pp. 1-4, XP002352528, http://www.cadence.com/dtatsheets/smic_joints_ds.pdf.

Internet Forum: Deepchip, "8 Engineers Discussing 7 Types of Adder Hardware Implementations", Online! Feb. 16, 2000, pp. 1-4, XP002352529, http://www.deepchip.com/items/0343-13.html.

Summons to attend oral proceedings pursuant to Rule 115(1) EPC for European patent application No. 05020717.4-2212, dated Jan. 28, 2010, 1 page.

Minutes of the oral proceedings before the European Patent Office for European patent application No. 05020717.4-2212, dated Jul. 14, 2010, 9 pages.

Decision of the Examining Division of the European Patent Office for European patent application No. 05020717.4-2212, dated Jul. 9 and Jul. 16, 2010, 12 pages.

* cited by examiner

*Primary Examiner* — Chuong D Ngo
(74) *Attorney, Agent, or Firm* — Brinks Gilson & Lione

(57) ABSTRACT

Herein described is a method and system of implementing integrated circuit logic modules that provide maximum efficiency and minimum energy dissipation. In a representative embodiment, a method of implementing one or more digital signal processing functions comprises determining one or more parameters associated with generating an optimal logic module. The one or more parameters may comprise the circuit area of the logic module and the processing time through a critical path of the logic module. In a representative embodiment, the system comprises a logic module that utilizes four full adders arranged in a tree configuration. In a representative embodiment, the logic module comprises a carry-save accumulator that provides maximum efficiency and minimal energy dissipation.

26 Claims, 2 Drawing Sheets

4:2 Tree Accumulator

IMPLEMENTATION OF DIGITAL SIGNAL PROCESSING FUNCTIONS USING MAXIMAL EFFICIENCY AND MINIMAL ENERGY DISSIPATION

BACKGROUND OF THE INVENTION

Digital signal processing functions may be implemented in silicon using a number of different processes or methodologies. The implementation of digital signal processing circuits such as digital filters, multipliers, and accumulators may be performed using one or more design building blocks or logic modules. These design building blocks or logic modules may comprise multi-operand adders and registers.

In many instances, the logic modules may not be optimally designed. For example, the overall chip area used to implement the logic module may be too large. In other instances, the overall processing delay associated with the components of the logic module may be suboptimal. Yet, in other instances, the power consumed by the logic module may be excessive for the digital signal processing functions implemented.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and a method of implementing integrated circuit logic modules that provide maximum efficiency and minimal energy dissipated per unit of operation. In a representative embodiment, a four input/two output carry-save accumulator may be used as a logic module that exhibits this maximum efficiency and minimal energy dissipation.

In a representative embodiment, a method of implementing signal processing functions on an integrated circuit chip comprises using a minimum cell area for each of one or more cells of one or more logic modules of the integrated circuit chip such that an efficiency of each of the one or more logic modules is maximized. The method further comprises using four carry-save adders in each of the one or more logic modules.

In another representative embodiment, a method of designing a logic module using one or more cells, wherein the logic module implements one or more digital signal processing functions comprises determining a minimum circuit area of the logic module. The minimum circuit area generates a maximum efficiency of the logic module.

In a representative embodiment, a logic module for implementing highly efficient digital signal processing functions on an integrated circuit chip comprises four carry-save adders and two registers. The four carry-save adders may be arranged in a tree configuration such that its total processing delay is equivalent to that of the sum of the processing delays of the three carry-save adders and one register.

These and other advantages, aspects, and novel features of the present invention, as well as details of illustrated embodiments, thereof, will be more fully understood from the following description and drawings.

DETAILED DESCRIPTION OF THE INVENTION

Figure 1:
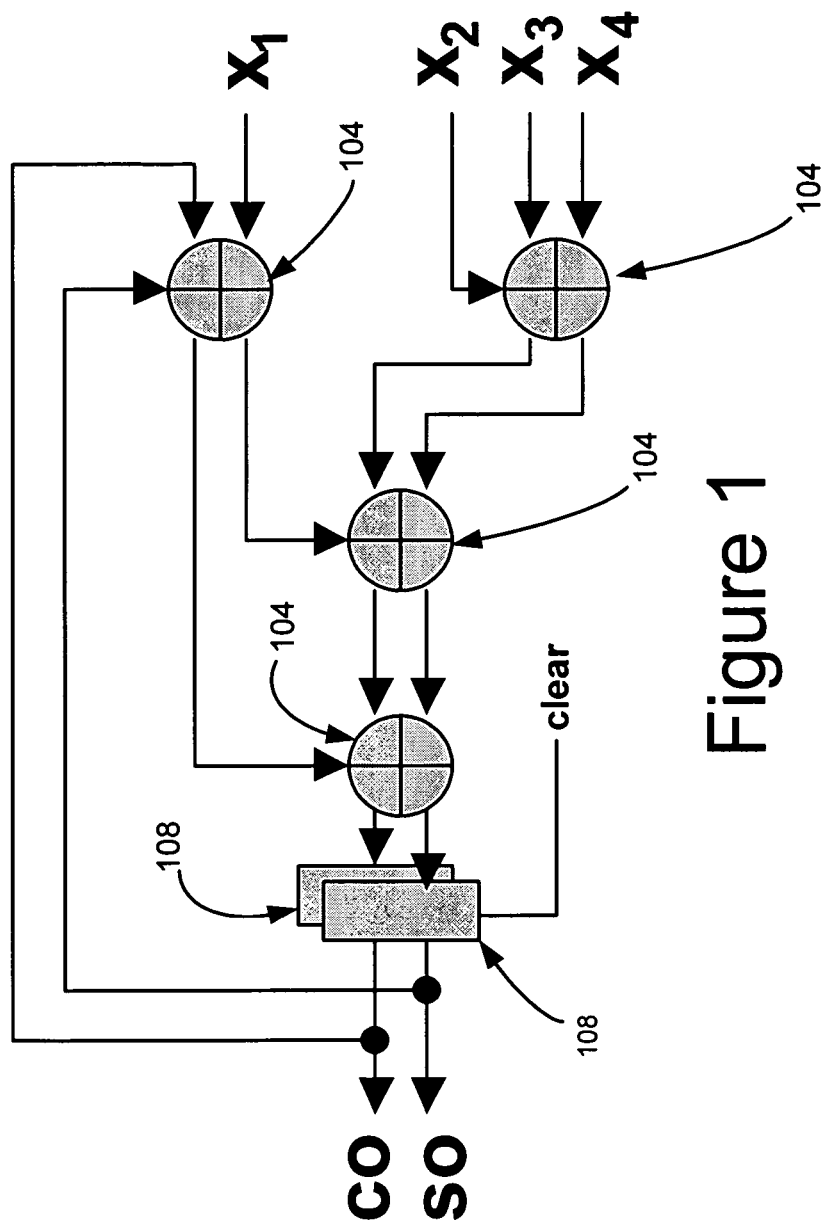
FIG. 1 is a functional block diagram of a four input/two output carry-save accumulator employed in the implementation of one or more digital signal processing circuits of an integrated circuit chip, in accordance with an embodiment of the invention.

Various aspects of the present invention provide at least a system and method that maximizes the efficiency of a logic module used in the implementation of one or more digital signal processing functions when fabricating an integrated circuit chip. The logic module may be defined as an elementary digital signal processing (DSP) unit that is used in the design and implementation of various digital signal processing circuitries.

Various aspects of the invention provide a method of utilizing one or more logic modules to implement a variety of digital signal processing circuitries. These logic modules may comprise one or more accumulators or multi-operand adders, for example. In a representative embodiment, each of the one or more accumulators may comprise one or more multi-operand adders. By concatenating the one or more accumulators together, one or more multipliers and digital filters may be implemented, for example. The digital filters may comprise a finite impulse response (FIR) filter or an infinite impulse response (IIR) filter, for example.

In a representative embodiment, the logic module comprises an implementation of a carry-save accumulator. The carry-save accumulator comprises four inputs and two outputs. The four input/two output carry-save accumulator may be implemented by using a 6:2 compressor along with two registers. The 6:2 compressor may be implemented using four 3:2 compressors. The 6:2 compressor with two output registers can be used as a generic building block to implement optimally pipelined DSP functions such as multipliers or digital filters. In a representative embodiment, the 6:2 compressor may be implemented using 3:2 compressors that are arranged in a tree configuration or tree structure. Aspects of the invention allow the use of one or more 6:2 compressors for implementing various digital signal-processing circuitries on an integrated circuit chip.

A design parameter referred to as the efficiency may be computed for the logic module. The efficiency may be defined by the following equation:

$$\eta = \frac{n_{add}}{T_c A}$$

The efficiency, $\eta$, is computed by dividing the number of additions, $n_{add}$, performed by the logic module by the product of $T_c$ and A. $T_c$ is defined as the cycle time required for the logic module to perform the number of additions, $n_{add}$. A is defined as the circuit area required to implement the logic module. As may be easily observed, the efficiency increases as the number of additions performed increases. Also, the efficiency increases as the area of the logic module decreases.

The variable $T_c$ is related to the overall processing delay associated with the logic module. The overall processing delay of the logic module determines the minimum clock period or maximum clocking frequency used to drive the logic module. For example, one or more registers within a logic module may require clocking at a suitable clock frequency in order to adequately process data at its inputs. Its clock period may be larger than or equal to the overall processing delay associated with the logic module. The circuit area of the logic module comprises the areas of one or more cells. The height of each cell of the one or more cells is linearly related to the area of each cell. Alternatively, the width of each cell of the one or more cells is linearly related to the area of each cell.

Ideally, a logic module is designed such that its efficiency, η, is as high as possible. The efficiency may be alternatively described as an AT complexity. The AT complexity is equivalent to the product of the area and the overall processing delay of the logic module. A circuit designer will want the AT complexity to be as low as possible. Since increases in circuit area of an integrated circuit are associated with increases in manufacturing costs, smaller circuit areas are used to implement a logic module. Correspondingly, smaller cells (associated with smaller cell areas) are used to implement a logic module. Using smaller cell heights for each cell, for example, may reduce the cell area.

With respect to various aspects of the present invention, an optimal value for the efficiency of a carry-save accumulator occurs when a total of four 3:2 compressors (carry-save adders) are utilized in the 6:2 compressor and the four 3:2 compressors are configured as a tree configuration or tree structure. The 6:2 compressor that is used in such a tree structure is subject to a processing delay equivalent to that of three 3:2 compressors, or three full adders. The processing delay of the 6:2 compressor is independent of the word length of its input vectors since the 3:2 compressors comprise four carry-save adders. The four carry-save adders do not propagate carries, and as a consequence, the 6:2 compressor does not propagate any carries.

FIG. 1 is a functional block diagram of a four input/two output carry-save accumulator employed in the implementation of one or more digital signal processing functions of an integrated circuit chip, in accordance with an embodiment of the invention. The four input/two output accumulator incorporates the use of a six input/two output multi-operand carry-save adder. The multi-operand carry-save adder eliminates carry propagation by handing redundant carry-save results to the next adder in the processing chain. The carry-save accumulator illustrated in FIG. 1 may be described as a 4:2 accumulator using a 3:2 compression tree structure, since it utilizes four 3:2 compressors (or four carry-save adders) 104 arranged in a tree configuration. Hereinafter, the 4:2 accumulator using a 3:2 compression tree structure may be referred to as a 4:2 tree accumulator. The 4:2 tree accumulator has four inputs and two outputs. Each of the four inputs $x_1$, $x_2$, $x_3$, and $x_4$ may comprise a vector of any word length. For example, the vector may comprise a 32 bit word. The outputs $C_0$ (carry) and $S_0$ (sum) are fed back as inputs into two of the four 3:2 compressors 104 of the 4:2 tree accumulator. Furthermore, the 4:2 tree accumulator comprises two registers 108 as shown. The two registers 108 provide carry and sum outputs to the next logic module in a pipeline, for example. As may be seen from FIG. 1, the processing delay and the circuit area associated with the 4:2 tree accumulator may be defined by the following equations:

$$T = \tau_{reg} + 3 \cdot \tau_{add}$$

$$A = A_{reg} + 4 \cdot A_{add}$$

Figure 2:
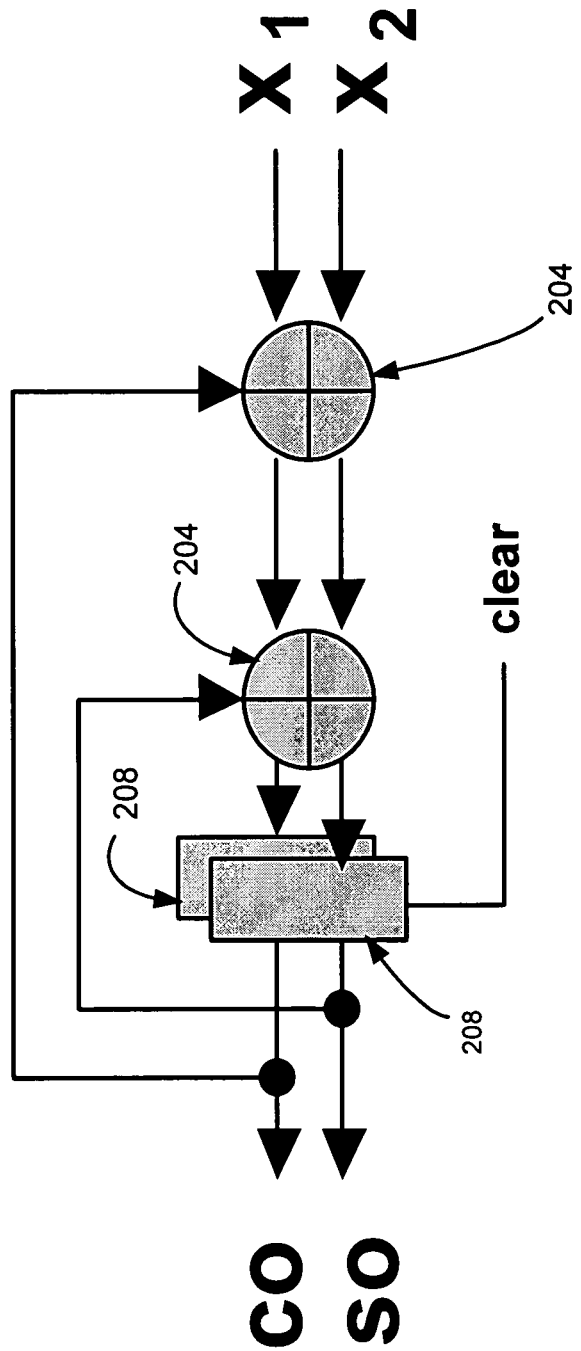
FIG. 2 is a functional block diagram of a two input/two output linear chain carry-save accumulator.

The processing delay (T) of the 4:2 tree accumulator is equal to the sum of the register delay ($\tau_{reg}$) and the delay through the critical path of the four carry-save adder tree ($3 \cdot \tau_{add}$). One may obtain an optimal value for the efficiency when using the 4:2 tree accumulator shown in FIG. 1. Furthermore, the energy consumed per addition is significantly lower than any other carry-save accumulator having a comparable efficiency, when using any number of full adders configured either in a linear chain or in a tree structure. Compared to that of a 2:2 (two input/two output) linear chain carry-save accumulator, as illustrated in FIG. 2, there is approximately a 29% reduction in the amount of energy dissipated per addition when using the 4:2 tree accumulator, given the same input vector word lengths. The 2:2 linear chain carry-save accumulator comprises two 3:2 compressors (or full adders) 204 arranged linearly. The two inputs of the 2:2 linear chain carry-save accumulator comprise the vectors $x_1$ and $x_2$. The 2:2 linear chain carry-save accumulator also comprises two registers 208. The two registers 208 provide outputs $C_0$ and $S_0$ that are fed back as inputs into each of the two 3:2 compressors 204. Although the 2:2 linear chain carry-save accumulator provides a value for the efficiency that is similar to that of the 4:2 tree accumulator, the 2:2 linear chain carry-save accumulator consumes significantly more energy per addition. In other words, the 2:2 linear chain carry-save accumulator dissipates more energy per addition operation compared to the 4:2 tree accumulator. As a consequence, an addition operation provided by the 2:2 linear chain carry-save accumulator of FIG. 2 uses significantly more energy than that of an addition operation provided by the 4:2 tree accumulator of FIG. 1. A maximum value for the efficiency, η, occurs when the area of the individual logic cells in the multi-operand adders is close to a minimum value given by the resolution of the lithographic process that is used to manufacture the integrated circuit.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of implementing signal processing functions on an integrated circuit chip comprising:
   using a minimum cell area for each of one or more cells of one or more logic modules of said integrated circuit chip such that an efficiency of each of said one or more logic modules is maximized; and
   using four carry-save adders in each of said one or more logic modules.

2. The method of claim 1 wherein said four carry-save adders are configured as a tree structure.

3. The method of claim 2 wherein said efficiency is computed using the equation, $$\eta = \frac{n_{add}}{T_c A},$$

wherein $n_{add}$ is defined as a number of addition operations performed by a logic module of said one or more logic modules, $T_c$ is defined as the cycle time required for said logic module to perform said number of addition operations, $n_{add}$, and A is defined as the circuit area required to implement said logic module.

4. The method of claim 1 wherein each of said one or more logic modules dissipates a minimum energy per addition operation.

5. The method of claim 1 wherein each of said one or more logic modules comprises a six input / two output multi-operand carry-save adder and two registers, said six input / two output multi-operand carry-save adder implemented using said four carry-save adders configured in a tree structure.

6. The method of claim 5 wherein said one or more logic modules is used to implement one or more multipliers.

7. The method of claim 5 wherein said one or more logic modules is used to implement one or more digital filters.

8. The method of claim 7 wherein said one or more digital filters comprises a FIR filter.

9. The method of claim 7 wherein said one or more digital filters comprises an IIR filter.

10. A method comprising:
   determining a minimum cell height associated with a first circuit area of a logic module comprising four carry save adders, said first circuit area associated with generating a maximum efficiency of said logic module, and
   using said logic module to implement one or more digital signal processing functions.

11. The method of claim 10 wherein said logic module implements an accumulator, said accumulator comprising a six input / two output multi-operand carry-save adder and two registers.

12. The method of claim 10 wherein said four carry-save adders are arranged in a tree structure.

13. The method of claim 10 wherein said efficiency is computed by dividing a number of additions performed by said logic module by a product of said first circuit area and a clock period, said clock period associated with a clock that is used to process data using said logic module.

14. The method of claim 13 wherein said clock period is equal to a processing delay of said logic module.

15. The method of claim 14 wherein said processing delay corresponds to a critical path delay of said logic module.

16. The method of claim 13 wherein said first circuit area is equal to the sum of a second circuit area corresponding to one or more registers in said logic module, and a third circuit area corresponding to one or more carry-save adders in said logic module.

17. A logic module for implementing highly efficient digital signal processing functions on an integrated circuit chip comprising:
   four carry-save adders, wherein said four carry-save adders is implemented in said logic module such that a product of a time value and an area used to implement said logic module equals a minimum value, said logic module capable of performing a number of addition operations, said time value equal to the time required to perform said number of addition operations.

18. The logic module of claim 17 further comprising two registers.

19. The logic module of claim 18 wherein said four carry-save adders are arranged in a tree structure such that minimum energy is dissipated per full adder.

20. The logic module of claim 19 wherein said logic module comprises a four input / two output carry-save accumulator.

21. The logic module of claim 19 wherein said logic module comprises a six input / two output carry-save adder.

22. The logic module of claim 19 wherein using said four carry-save adders and said two registers generates a processing delay equivalent to that of the sum of the processing delays of three of said four carry-save adders and one register.

23. A carry-save accumulator comprising:
   four 3:2 (three input / two output) carry-save adders arranged in a 4:2 (four input / two output) tree configuration; and
   two registers, wherein outputs of said two registers is fed back as inputs to two of said four 3:2 (three input / two output) carry save adders, said two registers clocked by a clock having period equal to an overall processing delay associated with said carry-save accumulator.

24. The carry-save accumulator of claim 23 wherein said overall processing delay is equal to the sum of a first delay of a register of said two registers and a second delay through a critical path of said 4:2 (four input / two output) tree configuration.

25. The carry-save accumulator of claim 24 wherein said second delay is equal to three times the delay through one of said four 3:2 carry-save adders.

26. The carry-save accumulator of claim 23 wherein a circuit area used to implement said carry-save accumulator is equal to a first circuit area corresponding to one of said two registers and a second circuit area corresponding to four times the circuit area of one of said four 3:2 carry-save adders.

\* \* \* \* \*